UNITED STATES PATENT OFFICE.

JAMES M. SKINNER, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

PROCESS OF TREATING WOOD SEPARATORS FOR STORAGE BATTERIES.

1,052,851. Specification of Letters Patent. Patented Feb. 11, 1913.

No Drawing. Application filed March 13, 1912. Serial No. 683,631.

*To all whom it may concern:*

Be it known that I, JAMES M. SKINNER, of Philadelphia, in the State of Pennsylvania, have invented a certain new and useful Improvement in Processes of Treating Wood Separators for Storage Batteries, whereof the following is a specification.

It is the object of my invention to provide wooden diaphragms to be used as separators between the positive and negative plates of a secondary or storage battery, deprived of the natural constituents of the wood which, if allowed to remain, tend to decompose when immersed in the usual electrolyte, viz., an aqueous solution of sulfuric acid, and subjected to the action of the battery, and form acetic acid or other products which are deleterious to the battery. Such deleterious constituents of the natural wood are principally contained in its lignone; the formation of acetic acid and other acids of like nature being a characteristic of such decomposition of lignone. For instance, acetic acid may be formed from the wood by simple hydrolysis of lignocellulose, and oxidation of wood nuclei of ketonic or aldehydic structure. It is characteristic of my invention that the wood is deprived of said deleterious constituents by salts, and that the wood treated therewith may be allowed to dry in the interim between its treatment and its inclusion in a battery, without materially shrinking, warping, or cracking. Moreover, my invention is advantageous in that separators treated in accordance therewith have greater strength and durability than wood separators treated with the ordinary acid or alkaline processes.

The wood to be treated is cut in suitable forms, approximately plane sheets, and immersed in an aqueous solution of salt; preferably neutral sulfite or bisulfite. For instance, I have used an aqueous solution of sodium bisulfite ($NaHSO_3$) containing 25 per cent., by weight, of that salt; being a solution which is nearly saturated. However, it is to be understood that other similar salts may be employed, and, that the percentage of salt in the solution may be less; for instance, a solution containing 7 per cent. of such salt may be employed, although, of course, necessitating a longer time of treatment of the wood than would be required in the employment of stronger solutions. Although such solutions may be used at atmospheric temperatures, and open to the atmosphere; higher temperatures and corresponding pressures tend to accelerate the desired reactions and prevent reverse action, *i. e.* condensation of the products. For instance, a temperature of from 100 to 175 degrees centigrade, with corresponding pressure, may be advantageously employed.

The treatment with neutral sulfites involves a simple hydrolytic action. In the presence of the lignocellulose complex, undergoing decomposition, the sulfite is dissociated, the base going to saturate acid groups, and the sulfite ions ($SO_3H$) going to aldehydic and ketonic groups; both products being readily soluble in water, and therefore susceptible of being washed out of the treated wood. With bisulfites, the hydrolizing action is greater than with neutral sulfites. Moreover, the base serves to saturate acid groups and to remove them from the region of action, and the process is aided by sulfonation of $CH:CH$ groups and the addition of $SO_3H$ to aldehydic and ketonic groups, while the presence of the excess of bisulfite, by virtue of its deoxidizing powers, prevents reversal, by condensation, of the products which are readily soluble in water, and therefore susceptible of being washed out of the treated wood.

The wood separators treated as above contemplated may be washed, to free them of said products which are soluble in water, and then dried with or without artificial heat, and with or without pressure. Good results are obtained by laying the separators horizontally in piles, with a weight on top of each pile.

I do not desire to limit myself to the particular salts named or to the precise proportions thereof above stated, or to the particular temperatures named, as various modifications may be made therein without departing from the essential features of my invention as defined in the appended claims.

I claim:—

1. The process of treating wood separators for storage batteries which consists in immersing them in an aqueous solution of neutral sodium bisulfite while maintaining said solution at a temperature of from 100 to 175 degrees centigrade; washing from the treated wood the products of decomposition effected, by the action of said solution; and, drying the wood, under pressure.

2. The process of treating wood separators for storage batteries which consists in immersing them in an aqueous solution of a salt of sulfurous acid while maintaining said solution at a temperature of from 100 to 175 degrees centigrade; washing from the treated wood the products of decomposition effected by the action of said solution; and, drying the wood, under pressure.

3. The process of treating wood separators for storage batteries which consists in immersing them in an aqueous solution of a salt of sulfurous acid, washing from the treated wood the products of decomposition effected by the action of said solution; and, drying the wood, under pressure.

4. The process of treating wood separators for storage batteries which consists in immersing them in an aqueous solution of a salt of sulfurous acid; and, washing from the treated wood the products of decomposition effected by the action of said solution.

In testimony whereof, I have hereunto signed my name at Philadelphia, Pennsylvania, this 11th (eleventh) day of March, 1912.

JAMES M. SKINNER.

Witnesses:
JOHN S. THOMAS,
EDUARD DAVIS.

---

Copies of this patent may be obtained for five cents each, by addressing the "Commissioner of Patents, Washington, D. C."